Oct. 28, 1969  J. M. COCHRAN, JR  3,475,625
DELAY CONTROL CIRCUIT
Filed Jan. 19, 1967

INVENTOR.
JOHN M. COCHRAN, JR.
BY
Cushman, Darby & Cushman
ATTORNEYS

United States Patent Office 3,475,625
Patented Oct. 28, 1969

3,475,625
DELAY CONTROL CIRCUIT
John M. Cochran, Jr., Greensboro, N.C., assignor to Burlington Industries, Inc., Greensboro, N.C., a corporation of Delaware
Filed Jan. 19, 1967, Ser. No. 610,290
Int. Cl. H03k 17/28, 3/26
U.S. Cl. 307—293
12 Claims

ABSTRACT OF THE DISCLOSURE

This invention relates to a control circut for applying an energizing signal to a load for a predetermined interval of time. A silicon controlled rectifier (SCR) is turned on by a pulse to initiate the time interval, the load being connected in series with the SCR. The timing interval is terminated by causing the cathode of the SCR to go more positive than the anode. This is accomplished by two timing circuits in the cathode circuit of the SCR. One of the timing circuits rapidly charges to a first value. The second timing circuit, which controls the length of the above-mentioned predetermined time interval, turns on a threshold switch, such as a four-layer diode or a unijunction transistor, after the second timing circuit charges to a second value, which corresponds to the threshold of the switch. When the switch is turned on, a third value of voltage is caused to be added to the voltage developed by the first timing circuit and thereby develop a cathode voltage which exceeds the anode voltage of the SCR. Thus, the SCR is turned off and the energizing signal is no longer applied to the load.

---

This invention relates to a control circuit for operating a load such as an air solenoid valve and, in particular, to a control circuit whereby the load is energized for a predetermined interval of time, after which the energizing signal applied to the load is removed.

The circuitry of the present invention is applicable in many areas and one application of particular importance is in the textile field. On looms using an automatic filling winder and changer, a high rate of jerked-in filling ends occurs. To remove the ends, air clearer vacuum devices have been employed which pick up the ends and deposit them in a waste receptacle. Typically, the air clearers are installed on the loom and a vacuum is created by the Venturi principle on each clearer. Air usually is supplied to each Venturi at about 30 to 80 p.s.i. If the air pressure is left on continuously, too much air is required making it impractical to use the clearers on a substantial number of looms. The present invention solves this problem by providing a control circuit which turns on the air to the Venturi when required and then turns it off after the appropriate time, typically 8 to 12 seconds. The air clearers must be turned on every time the filling is changed, this occurring randomly about every three to seven minutes.

Thus it is a primary purpose of this invention to provide improved control circuitry for regulating load devices such as air clearer vacuum devices whereby the device when required is operated for a predetermined interval of time.

It is a further object of this invention to provide improved control circuitry for regulating the amount of time an energizing signal is applied to a load device, the length of the interval of time being continuously variable.

Figure 1:
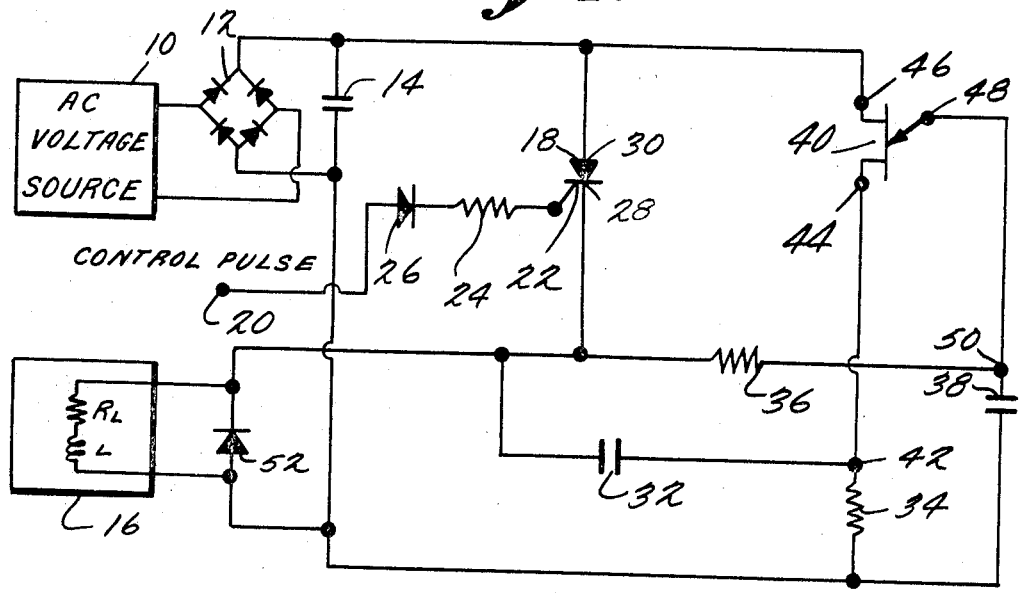
Figure 2:
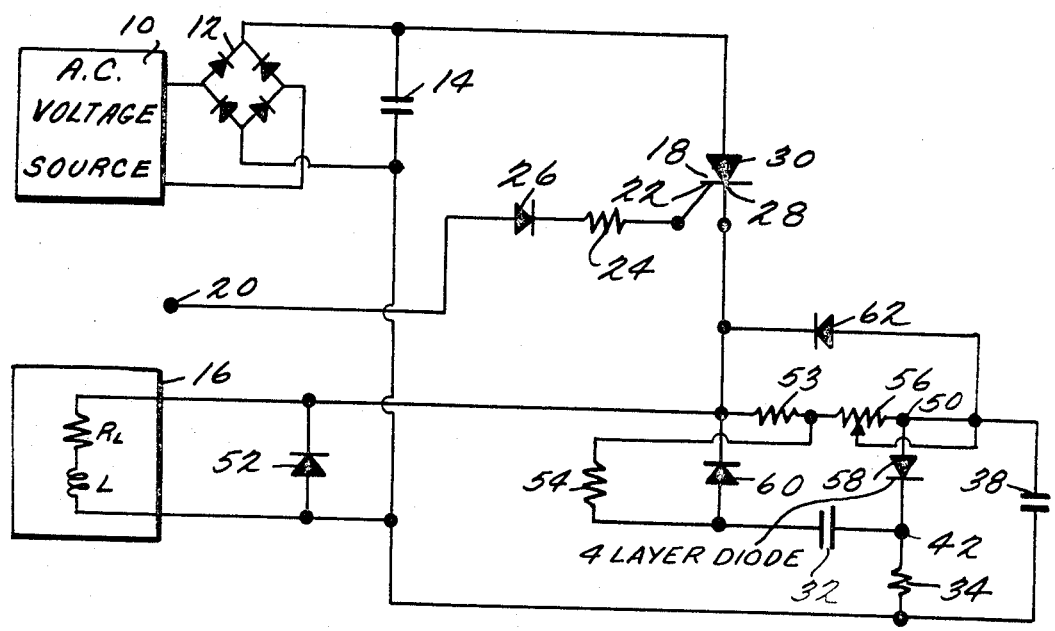

Other objects and advantages of this invention will become apparent upon reading the appended claims in conjunction with the following detailed description and the attached drawings, in which:

FIGURE 1 is a schematic diagram of one illustrative embodiment of the invention; and FIGURE 2 is a schematic diagram of another illustrative embodiment of the invention.

Referring to FIGURE 1, there is shown an AC source 10 connected to a full wave rectifier 12. A DC energizing voltage is developed across filter capacitor 14 for solenoid valve or load means or solenoid valve 16. The energizing voltage across capacitor 14 is applied to valve 16 through silicon controlled rectifier (SCR) or switching means 18 whenever a pulse or control signal is applied from terminal 20 to the control terminal 22 of SCR 18. The control pulse occurring at terminal 20 is produced by a switch (not shown) on the loom which closes when a new quill is placed in the shuttle. The switch for producing the control pulse may be connected to one side of the loom 12 volt transformer. Of course, other means for generating the control pulse at terminal 20 will be obvious to those having ordinary skill in the art depending on the particular application wherein the control circuit of FIGURE 1 is employed. Resistor 24 limits the current from the control pulse. Diode 26 rectifies the control pulse so that a reverse voltage is not applied to the SCR. Diode 52 provides suppression of the transient voltage developed across the solenoid coil inductance. Typically, source 10 provides a 12 volt signal from the loom transformer. Across capacitor 14, rectifier 12 generates a 12 to 16 volt DC signal, for example, which is employed by valve 16, which is typically rated for 12 volts DC at 10 watts.

When the control pulse is applied to the SCR 18, the SCR turns on and stays on until the energizing voltage across capacitor 14 is removed or until the SCR cathode 28 is made momentarily more positive than the anode 30. The approach employed by this invention is to make the cathode positive with respect to the anode.

A first timing circuit or means comprising capacitor 32 and resistor 34 is connected in series circuit with the SCR 18 and in parallel circuit with the valve 16. A second timing circuit or means is also placed in series circuit with the SCR 18, this second timing circuit including resistor 36 and capacitor 38. Unijunction transistor or threshold switching means 40 is connected between the anode of SCR 18 and a terminal 42 between capacitor 32 and resistor 34—that is, the base terminal 44 is connected to terminal 42 and the base terminal 46 is connected to the anode 30 of the SCR. The emitter 48 of unijunction transistor 40 is connected to terminal 50 between resistor 36 and capacitor 38.

Having now described the structural relation of the various circuit components to one another, the operation thereof will now be described. When a control pulse is applied to the control terminal 22 of SCR 18, the SCR turns on and stays on, thereby applying the energizing voltage across capacitor 14 to DC solenoid valve 16. As long as SCR 18 remains on, solenoid valve 16 will be energized. However, at the same moment that the SCR 18 is turned on, forces are set in motion to turn it off.

First, the capacitor 32 charges to the voltage on the cathode 28 of SCR 18, to thereby develop a first signal. At the same time, capacitor 38 also charges toward the cathode voltage of the SCR through resistor 36 to develop a second signal. The value of the resistor 36 is so chosen that the amount of time required for capacitor 38 to charge to the threshold of unijunction transistor 40 (which is established by the voltage drop across the emitter 48 and base terminal 44) corresponds to the predetermined interval of time that the solenoid valve 16 is energized. As soon as the unijunction transistor 40 is turned on, the voltage at the anode of SCR 18 is switched across resistor 34, thereby producing a third signal. Since the time constant of capacitor 32 and resistor 34 is chosen to be substantially less than the time constant of resistor 36 and capacitor 38, the capacitor 32 has already charged to a value of voltage approximating that at the cathode of SCR. Thus, when the voltage at anode 30 is switched across resistor 34 by unijunction transistor 40 to produce the third signal, the SCR cathode voltage is raised by an amount equal to the sum of the first signal developed across capacitor 32 and the third signal developed across resistor 34. The sum of these two signals is in excess of the SCR anode voltage and thus the SCR is turned off. With SCR 18 off, current no longer flows through the solenoid valve 16; thus, the predetermined interval of time for which the solenoid valve 16 is energized is terminated.

Reference should now be made to FIGURE 2 which illustrates another embodiment of the invention. The basic difference between the embodiments of FIGURE 1 and FIGURE 2 lies in the type of switch employed to bring about the termination of the predetermined time interval for which the solenoid 16 is energized. Elements which serve the same function in both the embodiments of FIGURES 1 and 2 are referenced by common reference numerals.

The first timing circuit or means comprises resistors 53, 54, and 34, and capacitor 32. The second timing circuit means includes resistor 53, potentiometer 56 and capacitor 38. A four-layer diode or threshold switching means 58 is connected between terminals 50 and 42. Diode 60 is connected between the cathode of SCR 18 and capacitor 32 while diode 62 is connected between the SCR cathode and terminal 50.

Potentiometer 56 is typically variable between zero and 500K ohms, these values respectively corresponding to delays of 0.1 second and 40 seconds. When the capacitor 38 is charged to a voltage sufficient to fire four-layer diode 58, the capacitor 38 rapidly discharges through switch 58 to thereby develop a third signal across resistor 34 which is added to that already developed across capacitor 32. This sum voltage is then placed on the cathode 28 of the SCR through diode 60 thereby turning the SCR off since the cathode voltage exceeds the anode voltage. Diode 62 permits complete rapid discharge of capacitor 38 after the SCR 18 is turned off.

It can now be seen that the operation of FIGURES 1 and 2 is substantially similar with different type switches being employed to bring about the termination of the predetermined period of time that solenoid 16 is energized.

Still numerous other modifications of the invention will become apparent to one of ordinary skill in the art upon reading the foregoing disclosure. During such a reading, it will be evident that this invention has provided unique circuitry for accomplishing the objects and advantages herein described. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. A control circuit responsive to an energizing signal and a control signal for energizing load means for a predetermined interval of time, said control circuit comprising:

switching means having anode, cathode, and control terminals, said switching means being serially connected to said load means to apply said energizing signal thereto in response to said control signal being applied to said control terminal of said switching means, the application of said control signal to said switching means initiating said predetermined time interval;

first timing means serially connected to said switching means and connected in parallel with said load means for producing a first signal in response to said control signal being applied to said switching means;

threshold switching means electrically connected to said first timing means; and second timing means serially connected to said first-mentioned switching means, connected in parallel with said first timing means, and electrically connected to said threshold switching means to develop a second signal which turns said threshold switching means on after said predetermined time interval has elapsed to thereby cause a third signal to be added to said first signal to cause the voltage at the cathode of said first-mentioned switching means to exceed the anode voltage of said first-mentioned switching means, thus terminating said predetermined time interval.

2. A control circuit, as in claim 1, where said second timing means includes means for varying the length of said predetermined interval of time.

3. A control circuit, as in claim 1, where said first timing means includes a first capacitor and a first resistor in series with said first mentioned switching means and where said second timing means includes a second resistor and a second capacitor, the said first signal being developed across said first capacitor and the said second signal being developed across said second capacitor.

4. A control circuit, as in claim 3, where the value of said second resistor is variable, thereby varying the length of said predetermined interval of time in accordance with the value of said second resistor.

5. A control circuit, as in claim 4, where said threshold switching means is connected between said anode and said first resistor to place said anode voltage across said first resistor when the threshold of said switching means is equal to said second signal to thereby add said anode voltage to said first signal and cause said cathode voltage of said first-mentioned switching means to be more positive than said anode voltage.

6. A control circuit, as in claim 4, where said threshold switching means is connected between said second capacitor and said first resistor to place said second signal across said first resistor when said second signal equals the breakdown voltage of said switching means and thereby add said second signal to said first signal and cause the cathode of said first-mentioned switching means to be more positive than the anode voltage thereof.

7. A control circuit, as in claim 4, where said threshold switching means is a unijunction transistor.

8. A control circuit, as in claim 4, where said threshold switching means is a four-layer diode.

9. A control circuit responsive to a control signal for permitting current to flow through a load means for a predetermined period of time comprising:

a source of electrical energy, first switching means having an anode, cathode and control terminal and connected to said source and said load so a current path is created through said anode terminal, said first switching means, said cathode terminal, and said load means, said first switching means being driven into a state of conduction when said control signal is received at said control terminal, and into a state of non-conduction when the voltage at the terminal of said first switching means connected to said load means exceeds the voltage at the terminal of said first switching means connected to said source, a first timing circuit comprising a serially connected first resistor and first capacitor connected in parallel with said load means, one of the terminals of said first resistor being connected to said load means, a second timing circuit comprising a serially connected second capacitor and second resistor connected in parallel with said load means, one of the terminals of said second capacitor being connected to said load means, and threshold switching means connected to the junction of said first resistor and first capacitor and connected to the junction of said second capacitor and second resistor so that when said first capacitor is charged to a given level said threshold switching means is driven into a state of conduction raising the voltage of the junction between said second capacitor and said second resistor to raise the voltage at the point of junction between said first switching means and said load means above the voltage at the terminal of said switching means connected to said source to drive said first switching means into a state of nonconduction.

10. A circuit as in claim 9 wherein said terminal of said first switching means connected to said source is said anode and said terminal of said first switching means connected to said load means is said cathode.

11. A circuit as in claim 10 wherein said threshold switching means is a unijunction transistor.

12. A circuit as in claim 11 wherein said threshold switching means is a four layer diode.

References Cited

UNITED STATES PATENTS

| 3,181,009 | 4/1965 | Felcheck | 307—293 XR |
| 3,204,123 | 8/1965 | Mahoney et al. | 307—274 XR |
| 3,259,825 | 7/1966 | James | 307—293 XR |

JOHN S. HEYMAN, Primary Examiner

JOHN ZAZWORSKY, Assistant Examiner

U.S. Cl. X.R.

307—265, 274, 284, 287